United States Patent
Langguth et al.

(10) Patent No.: US 11,580,703 B1
(45) Date of Patent: Feb. 14, 2023

(54) ADAPTIVE MODEL UPDATES FOR DYNAMIC AND STATIC SCENES

(71) Applicant: Meta Platforms Technologies, LLC, Menlo Park, CA (US)

(72) Inventors: Fabian Langguth, Zurich (CH); Alexander Sorkine Hornung, Zurich (CH)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/220,814

(22) Filed: Apr. 1, 2021

Related U.S. Application Data

(60) Provisional application No. 63/078,804, filed on Sep. 15, 2020.

(51) Int. Cl.
*G06T 19/00* (2011.01)
*G06T 19/20* (2011.01)
*G06T 17/00* (2006.01)
*G06V 10/20* (2022.01)
*G06V 20/64* (2022.01)

(52) U.S. Cl.
CPC ............ *G06T 19/006* (2013.01); *G06T 17/00* (2013.01); *G06T 19/20* (2013.01); *G06V 10/255* (2022.01); *G06V 20/64* (2022.01); *G06T 2200/04* (2013.01); *G06T 2210/36* (2013.01); *G06T 2219/004* (2013.01); *G06T 2219/2016* (2013.01)

(58) Field of Classification Search
CPC ... G06K 9/00201; G06T 17/00; G06T 19/006; G06T 19/20
See application file for complete search history.

(56) References Cited

U.S. PATENT DOCUMENTS

2015/0262412 A1* 9/2015 Gruber ................. G06T 15/50 345/426
2017/0278304 A1* 9/2017 Hildreth ............... G06F 3/0484

\* cited by examiner

Primary Examiner — Charles Tseng
(74) Attorney, Agent, or Firm — Baker Botts L.L.P.

(57) ABSTRACT

In one embodiment, a computing system may update a first 3D model of a region of an environment based on comparisons between the first 3D model and first depth measurements of the region generated during a first time period. The computing system may determine that the region is static by comparing the first 3D model to second depth measurements of the region generated during a second time period. The computing system may in response to determining that the region is static, detect whether the region changed after the second time period based on comparisons between a second 3D model of the region and third depth measurements of the region generated after the second time period, the second 3D model having a lower resolution than the first 3D model. The computing system may in response to detecting a change in the region, update the first 3D model of the region.

20 Claims, 6 Drawing Sheets ately capture the geometry of a scene, objects within the scene may change (e.g., a chair is moved) or another object may be introduced into the scene (e.g., a person walks into the 3D scene). These changes may cause the 3D model to be inaccurate. To update the 3D model, an artificial reality system (e.g., an augmented reality system or virtual reality system) may observe a real-world scene and generate depth measurements, which are then used the update the 3D model. As an example and not by way of limitation, an artificial reality system (e.g., a head-mounted
ADAPTIVE MODEL UPDATES FOR DYNAMIC AND STATIC SCENES

PRIORITY

This application claims the benefit under 35 U.S.C. § 119(e) of U.S. Provisional Patent Application No. 63/078,804, filed 15 Sep. 2020, which is incorporated herein by reference.

TECHNICAL FIELD

This disclosure generally relates to controls and interfaces for user interactions and experiences in an augmented reality environment.

BACKGROUND

Augmented reality is a computer-generated simulation applied to an environment that users can interact with in a seemingly real or physical way. An augmented reality system, which may be a single device or a group of devices, may generate this simulation for display to a user, for example, on an augmented reality headset or some other display device. The simulation may include images, sounds, haptic feedback, and/or other sensations. As augmented reality becomes more and more prominent, its range of useful applications is rapidly broadening. The most common applications of augmented reality involve games or other interactive content, but other applications such as the viewing of visual media items (e.g., photos, videos) for entertainment or training purposes are close behind.

SUMMARY OF PARTICULAR EMBODIMENTS

Disclosed herein are a variety of different ways of rendering and interacting with an augmented (or virtual) reality environment. An augmented reality system may render augmented reality elements to be applied to an environment (e.g., a real world scene), which may include virtual elements that is rendered for display to a user to be applied to a real-world environment. The augmented reality system may use a three-dimensional (3D) model of a scene to render virtual elements for the scene, such as a virtual reality environment and/or augmented reality elements to project within a scene. The 3D model may indicate the geometry of the objects within the scene. The geometry of the objects within the scene may allow the artificial reality system to properly account for physics effects, occlusion, lighting effects, and the like when rendering virtual elements. An artificial reality system may access the 3D model of a scene from a plurality of sources. As an example and not by way of limitation, the artificial reality system may retrieve a 3D model of a scene from a storage coupled to the artificial reality system. The 3D model may comprise 3D voxels of sign distance fields (SDF), specifying voxel distances to the closest surface. While the 3D model of the scene may initially accur display) that a user wears may scan a scene as the user rotates to compute and aggregate point clouds. These point clouds may be used to be compared to a high-resolution 3D model to update the 3D model. The continuous generation of depth measurements and updating a 3D model may be a computationally expensive process.

In order to reduce the computational cost of updating a 3D model, an artificial reality system may use various strategies to update the 3D model when necessary. In particular embodiments, the artificial reality system may adopt a strategy to segment a 3D model into various parts to update individually. The artificial reality system may routinely monitor each of the segments or regions to determine whether to update the corresponding part of the 3D model. In particular embodiments, the artificial reality system may build a simpler 3D model for each region or for the entire 3D model of a scene. Instead of comparing point clouds that are computed and aggregated from scans of a 3D scene to a high-resolution 3D model, the artificial reality system may simply compare the point clouds to the simpler 3D model to determine whether or not an update is needed. The artificial reality system may determine whether a difference between computed and aggregated point clouds and a simpler 3D model exceeds a threshold difference. When a difference is detected that exceeds the threshold difference, the artificial reality system may update the high-resolution 3D model. By selectively updating a high-resolution 3D model and/or parts of the high-resolution 3D model, the artificial reality system may reduce the computational cost of maintaining an accurate high-resolution 3D model.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
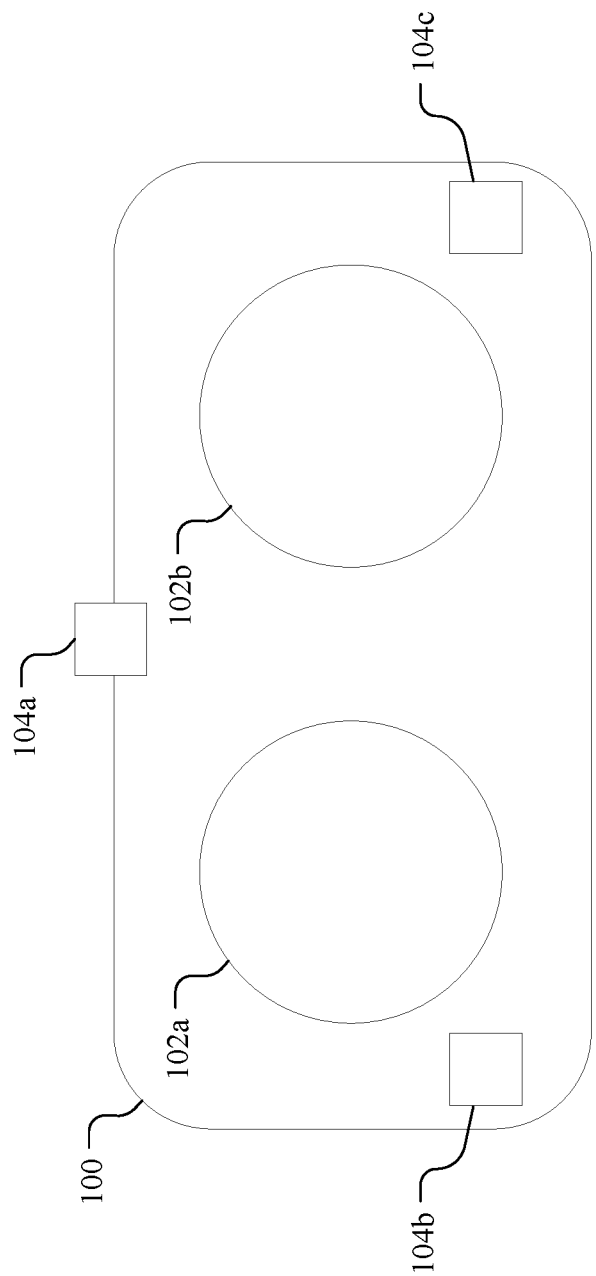
FIG. 1 illustrates an example artificial reality system.

Artificial reality systems may use a three-dimensional (3D) model of a scene to render virtual elements for the scene, such as a virtual reality environment and/or augmented reality elements to project within a scene. The 3D model may indicate the geometry of the objects within the scene. The geometry of the objects within the scene may allow the artificial reality system to properly account for physics effects, occlusion, lighting effects, and the like when rendering virtual elements. An artificial reality system may access the 3D model of a scene from a plurality of sources. As an example and not by way of limitation, the artificial reality system may retrieve a 3D model of a scene from a storage coupled to the artificial reality system. The 3D model may comprise 3D voxels of sign distance fields (SDF), specifying voxel distances to the closest surface. While the 3D model of the scene may initially accurately capture the geometry of a scene, objects within the scene may change (e.g., a chair is moved) or another object may be introduced into the scene (e.g., a person walks into the 3D scene). These changes may cause the 3D model to be inaccurate. To update the 3D model, an artificial reality system (e.g., an augmented reality system or virtual reality system) may observe a real-world scene and generate depth measurements, which are then used the update the 3D model. As an example and not by way of limitation, an artificial reality system (e.g., a head-mounted display) that a user wears may scan a scene as the user rotates to compute and aggregate point clouds. These point clouds may be used to be compared to a high-resolution 3D model to update the 3D model. The continuous generation of depth measurements and updating a 3D model may be a computationally expensive process.

In order to reduce the computational cost of updating a 3D model, an artificial reality system may use various strategies to update the 3D model when necessary. In particular embodiments, the artificial reality system may adopt a strategy to segment a 3D model into various parts to update individually. The artificial reality system may routinely monitor each of the regions to determine whether to update the corresponding part of the 3D model. In particular embodiments, the artificial reality system may build a simpler 3D model for each region or for the entire 3D model of a scene. Instead of comparing point clouds that are computed and aggregated from scans of a 3D scene to a high-resolution 3D model, the artificial reality system may simply compare the point clouds (or depth measurements) to the simpler 3D model to determine whether or not an update is needed. The artificial reality system may determine whether a difference between computed and aggregated point clouds and a simpler 3D model exceeds a threshold difference. When a difference is detected that exceeds the threshold difference, the artificial reality system may update the high-resolution 3D model. By selectively updating a high-resolution 3D model and/or parts of the high-resolution 3D model, the artificial reality system may reduce the computational cost of maintaining an accurate high-resolution 3D model.

In particular embodiments, the artificial reality system may initially access a high-resolution 3D model of a scene. As an example and not by way of limitation, the artificial reality system (e.g., a head-mounted display) may scan a scene, such as a living room and generate a 3D model of the living room. For instance, the artificial reality system may capture a series of images of the scene. The 3D model may be generated by using 3D voxels of SDF, specifying voxel distances the closest surface. As another example and not by way of limitation, the artificial reality system may retrieve a 3D model stored on the artificial reality system. For instance, if the artificial reality system has previously generated a 3D model of a scene, the artificial reality system may retrieve the 3D model. As another example and not by way of limitation, the artificial reality system may generate depth measurements using lidar. In particular embodiments, the artificial reality system may generate a simple 3D model. As an example and not by way of limitation, the simple 3D model may be the same type of voxel SDF used by a high-resolution 3D model, but at a lower resolution. For example, the simple 3D model may have bigger voxels. As another example and not by way of limitation, the simple 3D model may be a voxel and point count system to indicate voxel occupancy. The artificial reality system may generate the simple 3D model based on the high-resolution 3D model. Although this disclosure describes accessing a high-resolution 3D model of a scene in a particular manner, this disclosure contemplates accessing a high-resolution 3D model of a scene in any suitable manner.

In particular embodiments, the artificial reality system may segment a 3D scene into a plurality of regions. While a segment of the 3D scene may be described as a region of the 3D scene, a "segment" may be used to describe a region of the 3D scene. The artificial reality system may segment the 3D scene into equal regions. As an example and not by way of limitation, the artificial reality system may determine to segment the 3D scene into 1 square foot cubes to monitor. In particular embodiments, the artificial reality system may segment the 3D scene into viewable areas based on how often the camera pose spends in various poses. As an example and not by way of limitation, if the 3D scene includes a display panel (e.g., a TV), a couch, and a desk, then the artificial reality system may segment the 3D scene based on how often the artificial reality system may be situated at various camera poses. In particular embodiments, the artificial reality system may segment a 3D scene based on a frequency of change that occurs within a particular space. As an example and not by way of limitation, the artificial reality system may track how often a space (e.g. specific voxels) changes and/or needs to be updated. For instance, the artificial reality system may determine that a walkway in the 3D scene changes often and segment that space separately from the 3D scene. As another example, the artificial reality system may determine that a bookshelf in a 3D scene rarely changes and segment that space separately from the 3D scene. In particular embodiments, the artificial reality system may include two or more regions in a same segment group even if the regions are physically separated. As an example and not by way of limitation, the artificial reality system may include segmented regions corresponding to corners of a 3D scene within a same segment group. That is, the artificial reality system may determine that each of the identified regions may have a similar update frequency and group them together into a segment group. In particular embodiments, the artificial reality system may continuously segment the 3D scene and update the regions. Although this disclosure describes segmenting a 3D scene into regions in a particular manner, this disclosure contemplates segmenting a 3D scene into regions in any suitable manner.

In particular embodiments, the artificial reality system may monitor how often various spaces in the 3D scene changes and segment the 3D scene based on the information. The artificial reality system may measure the time between changes in various increments of time. As an example and not by way of limitation, the artificial reality system may track how often a particular space changes in seconds, minutes, etc. In particular embodiments, the artificial reality system may label certain spaces/regions as static if there is no detected change that occurs within that space for over a threshold time period or label certain spaces/regions as dynamic if there are changes that occur within that space within a threshold time period. As an example and not by way of limitation, if the artificial reality system does not detect a change to a space including a bookshelf, then the artificial reality system may label that space as static. As another example and not by way of limitation, if the artificial reality system detects continuous changes to a space including a walkway, then the artificial reality system may label that space as dynamic. Although this disclosure describes monitoring how often various spaces in the 3D scene changes in a particular manner, this disclosure contemplates monitoring how often various spaces in the 3D scene in any suitable manner.

In particular embodiments, the artificial reality system may perform segmentation on 2D images captured within the 3D scene to generate semantic information corresponding to objects in the 3D scene. As an example and not by way of limitation, the artificial reality system may identify a table within a 3D scene. In particular embodiments, the artificial reality system may generate a floorplan of the 3D scene indicative of the identified objects of the 3D scene. As an example and not by way of limitation, the artificial reality system may identify bounding boxes to be applied to the identified objects within the 3D scene and compile the bounding boxes into the floorplan. The floorplan may comprise semantic information, such as objects detected in the 3D scene. As an example and not by way of limitation, the floorplan may include bounding boxes with semantic labels. In particular embodiments, the semantic information may be used to segment the 3D scene. As an example and not by way of limitation, the artificial reality system may detect furniture within a 3D scene and segment the space comprising the furniture into the same segment group. For instance, the artificial reality system may use the semantic information to identify objects that rarely move, such as furniture, and group them together to reduce the need to update the space corresponding to the identified objects. In particular embodiments, the 3D model may be used to identify the objects within the 3D scene. Although this disclosure describes performing segmentation on 2D images in a particular manner, this disclosure contemplates performing segmentation on 2D images in any suitable manner.

In particular embodiments, the artificial reality system may update the 3D model. The artificial reality system may continuously scan a 3D scene through cameras coupled to the artificial reality system. The artificial reality system may compute and aggregate point clouds. The artificial reality system may generate depth measurements. The artificial reality system may compare the aggregated point clouds or depth measurements to a simple 3D model to determine whether to update a high-resolution 3D model of the scene. As an example and not by way of limitation, the artificial reality system may determine a difference between the aggregated point clouds corresponding to a region of the 3D scene and the respective region in the simple 3D model that exceeds a threshold difference. For instance, greater than 50 voxels appear to be different from the aggregated point clouds or depth measurements that correspond to the 50 voxels of the simple 3D model. The artificial reality system may determine to update the high-resolution 3D model based on determining the difference between the aggregated point clouds or depth measurements and the simple 3D model exceeds the threshold difference. The artificial reality system may determine to skip an update to the high-resolution 3D model if there is no detectable difference and/or if the difference is below a threshold change. As another example and not by way of limitation, the artificial reality system may use a simple 3D model that indicates voxel occupancy to compare to aggregated point clouds. The artificial reality system may determine to update the high-resolution 3D model if a comparison between the aggregated point clouds or depth measurements and the simple 3D model exceeds a threshold difference in occupancy. In particular embodiments, the artificial reality system may update one or more regions of the high-resolution 3D model separately. As an example and not by way of limitation, the artificial reality system may determine that a particular region of the 3D model (simple or high-resolution) changes, such as objects move within the particular region of the 3D model. Instead of requiring to update the whole entire high-resolution 3D model, the artificial reality system may update only the region that experiences a change. In particular embodiments, the artificial reality system may periodically compare aggregated point clouds (or depth measurements) to various regions of the 3D model based on how frequently the regions change. As described above, the artificial reality system may monitor times between which a region of the 3D model changes. The artificial reality system may use the information from monitoring the times (e.g., static label, dynamic label, etc.) to determine when to compare the aggregated point clouds (or depth measurements) to the corresponding region of the 3D model (simple or high-resolution). As an example and not by way of limitation, regions that are labeled as static may be checked to be updated every 10 seconds whereas a segment labeled as dynamic may be checked to be updated every 1 second. In particular embodiments, the artificial reality system may use a simple 3D model to check whether a static region has been updated. In particular embodiments, the artificial reality system may use a high-resolution 3D model to check whether a dynamic region has been updated. In particular embodiments, the artificial reality system may use the semantic information to determine whether to update the 3D model. As an example and not by way of limitation, if an object is detected to be a person, the artificial reality system may determine to update the regions of the 3D model corresponding where the person will travel. In particular embodiments, the artificial reality system may determine a motion of an object and estimate where the person will be to update the corresponding region. As an example and not by way of limitation, if the artificial reality system determines that a person is walking to a chair, the artificial reality system may determine to update the 3D model corresponding to the regions of the 3D model that include the path the person travels and the chair. In particular embodiments, the artificial reality system may determine to not update a 3D model based on semantic information. As an example and not by way of limitation, if the artificial reality system determines that a person is walking at the peripheral of the 3D scene, then the artificial reality system may determine to not update the 3D model. This may help reduce any necessary computation to update the 3D model twice. In particular embodiments, the artificial reality system may identify frequent reappearing objects corresponding to a region of a 3D scene and perform updates to the 3D model based on the identification of reappearing objects. As an example and not by way of limitation, if a dog typically naps in a corner during the day starting at noon, then the artificial reality system may determine to frequently check to compare the aggregated point clouds (or depth measurements) to the corresponding region of the 3D model around noon. Otherwise, the artificial reality system may determine to less frequently check to compare the aggregated point clouds (or depth measurements) to the corresponding region of the 3D model. In particular embodiments, the artificial reality system may track regions of the 3D model that are updated and which portions of the regions are updated. The artificial reality system may utilize the information of updated regions to determine whether to check whether the neighboring regions to the updated regions need to be updated. As an example and not by way of limitation, if a region of the 3D scene is updated while an object is entering the region of the 3D scene, then the artificial reality system may determine to check other regions (such as segments that may be less frequently updated) to compare aggregated point clouds (or depth measurements) to the other regions. For instance, if a region of a 3D scene corresponding to a bookshelf does not get updated often is next to a region that has been updated, then the artificial reality system may determine to compare the aggregated point clouds (or depth measurements) corresponding to the bookshelf. In particular embodiments, the artificial reality system may use the aggregated point clouds to update the 3D model. As an example and not by way of limitation, the artificial reality system may update the corresponding voxels of the high-resolution (or simple) 3D model based on the aggregated point clouds. Although this disclosure describes updating a 3D model in a particular manner, this disclosure contemplates updating a 3D model in any suitable manner.

In particular embodiments, the artificial reality system may use the 3D model to perform functions. As an example and not by way of limitation, the artificial reality system may use the 3D model to accurately render physics effects, occlusion, lighting effects, and the like when rendering virtual elements. For instance, if the artificial reality system generates an augmented reality panel, the artificial reality system may use the 3D model to accurately render the virtual element within the 3D scene. In particular embodiments, the artificial reality system may use the 3D model to track one or more objects within the 3D scene. As described herein, the 3D model may include semantic information corresponding to one or more objects, and the artificial reality system may track the individual objects through updates to the 3D model. For instance, when an object moves, the artificial reality system may update the position of the object within the 3D model. Although this disclosure describes using the 3D model in a particular manner, this disclosure contemplates using the 3D model in any suitable manner.

Referring to FIG. 1, an example artificial reality system 100 is shown. The artificial reality system 100 may be worn by a user to display an artificial reality environment to the user. While shown as a complete system, the artificial reality system 100 may be embodied as multiple devices coupled together. As an example and not by way of limitation, the artificial reality system 100 may be a smartphone coupled to a headset a user may wear. The artificial reality system 100 may comprise displays 102a, 102b to display content to the user. As an example and not by way of limitation, the artificial reality system may generate an artificial reality environment of an office space and render an avatar of a user comprising a facial representation of the user. As another example and not by way of limitation, the artificial reality system may generate augmented reality elements to project into a 3D scene. In particular embodiments, the artificial reality system may comprise a plurality of cameras 104. As an example and not by way of limitation, the artificial reality system 100 may comprise a plurality of cameras coupled to the artificial reality system 100 to capture images of the 3D scene. As an example and not by way of limitation, the camera 104a may capture the 3D scene directly in front of the user. In particular embodiments, the artificial reality system 100 may send the captured images from the plurality of cameras 104 to another computing system. The computing system may process the captured images to return data (e.g., 3D model, depth measurements, aggregated point clouds, etc.) to the artificial reality system 100. While a certain number of components of artificial reality system 100 is shown, the artificial reality system 100 may comprise more or less components and/or in different configurations. As an example and not by way of limitation, the artificial reality system 100 may comprise an additional camera and the configuration of all of the cameras 104 may change to accommodate the extra camera. For instance, there may be two additional cameras, and cameras 106b, 106c may be positioned closer to the displays 102a, 102b. While described as cameras 104, the cameras 104 may be embodied as depth measurement sensors. As an example and not by way of limitation, the cameras 104 may be embodied as a lidar sensor.

Figure 2:
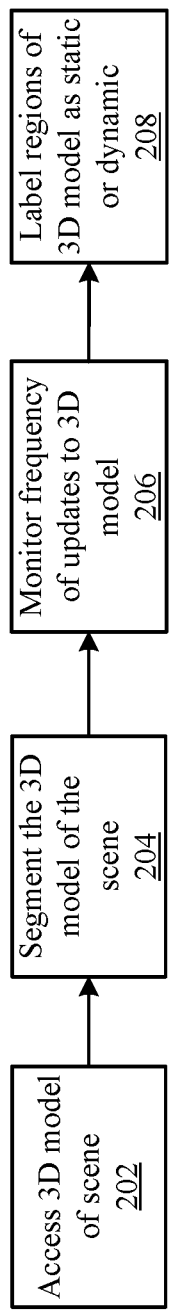
FIG. 2 illustrates an example flowchart of a 3D model segmentation process.

Referring to FIG. 2, a 3D model segmentation process 200 is shown. In particular embodiments, a system may perform the 3D model segmentation process 200 as described herein. As an example and not by way of limitation, an artificial reality system may perform the 3D model segmentation process 200. For example, an augmented reality system may perform the 3D model segmentation process 200. The process 200 may begin with the system accessing a 3D model of a scene in step 202 as described herein. As an example and not by way of limitation, the system may scan a scene to generate a 3D model of the scene. For example, the system may capture images corresponding to the scene to generate a 3D model of the scene.

In step 204, the system may segment the 3D model of the scene as described herein. As an example and not by way of limitation, the system may segment the 3D model into equal regions. In step 206, the system may monitor a frequency of updates to each region of the 3D model as described herein. As an example and not by way of limitation, the system may track the time between updates to a particular region of the 3D model. In particular embodiments, the system may merge, or further separate regions based on the frequency of updates. As an example and not by way of limitation, if the frequency of updates for two separate regions are similar, then they may be merged together. As another example and not by way of limitation, if one portion of a region is being updated relatively more frequently than another portion, then the system may separate out the region into two different regions. In step 208, the system may label regions of the 3D model as static or dynamic based on the frequency of updates corresponding to the region. As an example and not by way of limitation, if a particular region of the 3D model is updated every second, then that region may be labeled as dynamic. Whereas if a particular region has not experienced an update for at least 20 seconds, then that region may be labeled as static. The labels of the regions may be used to determine how frequently to monitor the respective region and which 3D model to use when detecting changes to the regions.

Figure 3:
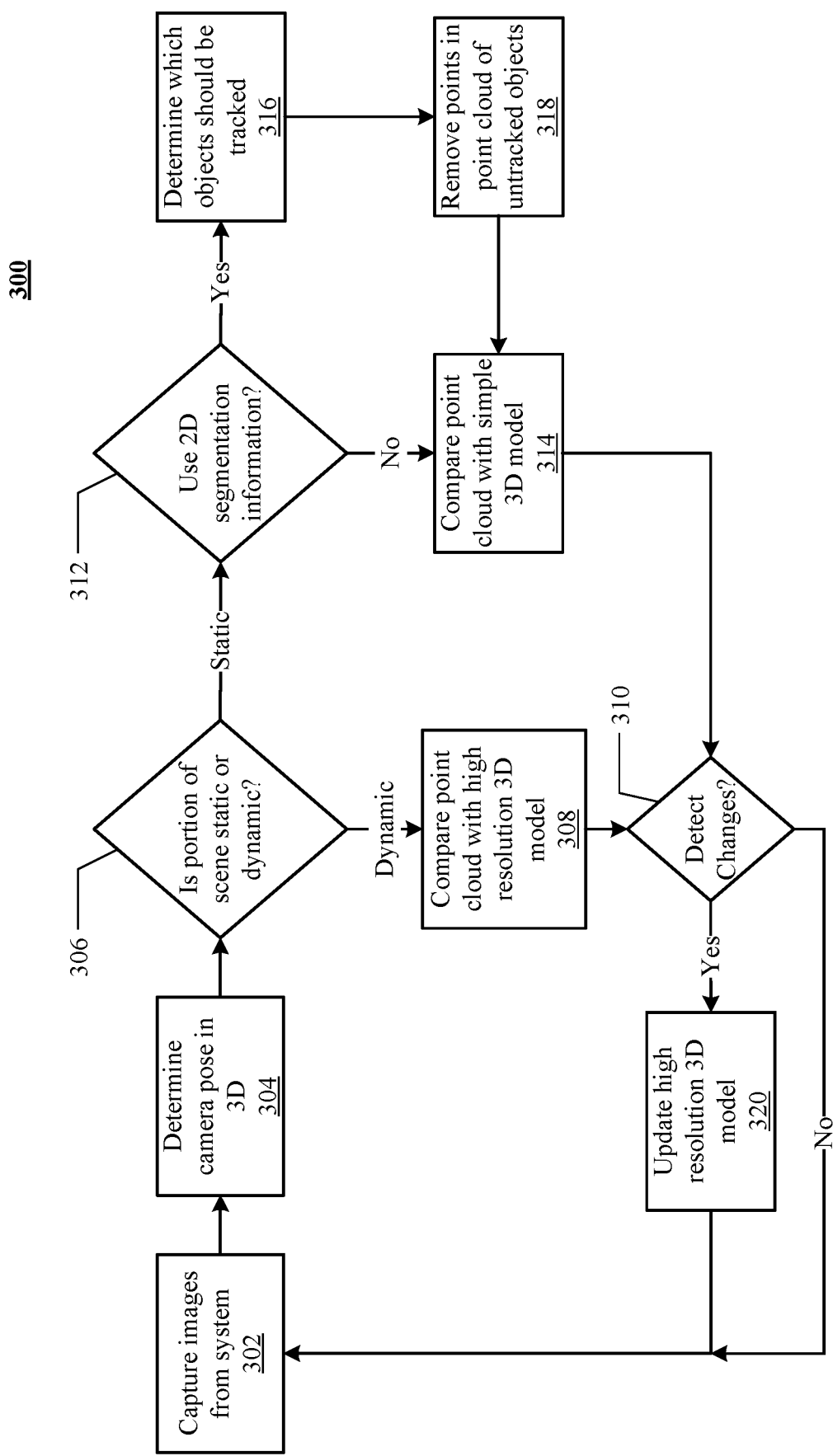
FIG. 3 illustrates an example flowchart of a 3D model updating process.

Referring to FIG. 3, a 3D model updating process 300 is shown. In particular embodiments, a system may perform the 3D model updating process 300 as described herein. As an example and not by way of limitation, an artificial reality system may perform the 3D model updating process 300. For example, an augmented reality system may perform the 3D model updating process 300. The process 300 may begin with step 302 where the system may capture images. As an example and not by way of limitation, the system may be coupled or include cameras that capture images of a scene. As another example and not by way of limitation, the system may receive captured images to process. When the system captures the images, the system may generate point clouds corresponding to the captured images. While step 302 describes capturing images, step 302 may include generating depth measurements as described herein. In step 304, the system may determine a camera pose associated with the images. The system may use the process 200 to identify which region corresponds to the captured image. As an example and not by way of limitation, if the captured image is of one of two desks in a 3D scene, the artificial reality system may determine the camera pose to identify which desk corresponds to the desk captured in the image. By determining the camera pose, the artificial reality system may determine which region of the 3D model corresponds to the captured image. In step 306, the system may determine whether a portion of the 3D scene corresponds to a static region of the 3D model or a dynamic region of the 3D model. In particular embodiments, the system may determine which portion is in the captured image based on the camera pose. While process 200 is shown to be separate from process 300, the system may perform the process 200 to update the regions of the 3D model. As an example and not by way of limitation, the system may determine that a previously labeled region was a static region, but after performing the process 200 for the current portion of the 3D scene corresponding to a captured image, the system may relabel the portion as dynamic and/or identify several different regions (static and dynamic) within the captured image. If the system determines the portion is a dynamic region of the 3D model, the process 300 may proceed to step 308, where the system may compare the point cloud generated from captured images with a high-resolution 3D model. In particular embodiments, the system may use depth measurements to compare to the high-resolution 3D model. After step 308, the process 300 may continue to step 310, where the system may determine whether there are any changes detected between the point cloud (or depth measurements) and the 3D model (high-resolution 3D model). In particular embodiments, the system may compare any detected changes to a threshold difference of changes to prevent noise from needlessly updating a high-resolution 3D model. As an example and not by way of limitation, if the system determines there are some changes between the point cloud and the simple 3D model, but the changes do not exceed a threshold difference, then the system may determine there were no detected changes. If the system determines that the portion is a static region of the 3D model, the process 300 may proceed to step 312, where the system may decide whether to use 2D segmentation information. If the system determines to not use 2D segmentation information, the process 300 may proceed to step 314, where the system may compare the point cloud generated from captured images (or depth measurements) with a simple 3D model. If the system determines to use the 2D segmentation information, the process 300 may proceed to step 316, where the system may determine which objects should be tracked. As an example and not by way of limitation, the system may identify a cat within the 3D scene that is captured within the image. In some scenarios the system may determine to not track the cat based on calculations that determine the cat is moving outside of the 3D scene. In some scenarios, the system may determine that the cat appears to be staying within the 3D scene that corresponds to the captured image and the system may need to track the cat. After step 316, the process 300 may continue to step 318, where the system may remove points in the point cloud of untracked objects. As an example and not by way of limitation, the system may identify a person as an object to not track and remove the points corresponding to the person. By removing the points corresponding to the person, the process 300 later on will not update the high-resolution 3D model based on the detection of the person. After step 318, the process 300 may proceed to step 314, where the system may perform the comparison between the point cloud corresponding to the captured image (or depth measurements) to the simple 3D model. After step 314, the process may proceed to step 310, where the system may determine whether there are any changes detected between the point cloud (or depth measurements) and the 3D model (simple 3D model). If the system detects changes, the process 300 may continue to step 320, where the system may update a high-resolution 3D model based on a comparison of a point cloud corresponding to the captured image (or depth measurements) to the high-resolution 3D model. If the system does not detect any changes, then the process 300 may restart at step 302, where the system captures further images of the 3D scene (or generates further depth measurements). In particular embodiments, the process 200 may be initiated at any step of process 300 to relabel regions of the 3D model accordingly.

Figure 4:
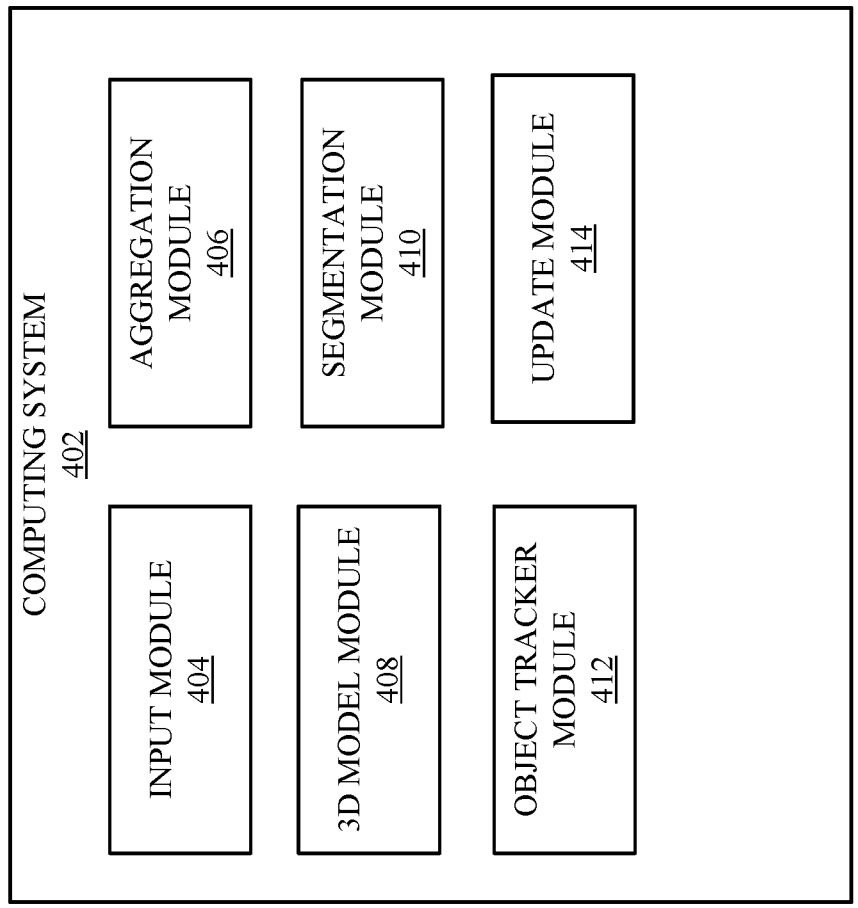
FIG. 4 illustrates an example computing system in an artificial reality environment.

FIG. 4 illustrates an example computing system 402 in an artificial reality environment 400. In particular embodiments, the computing system 402 may be embodied as an augmented reality headset, virtual reality headset, a server, a social-networking system, a third-party system, or a combination thereof. Although shown as an individual computing system 402, the computing system 402 may be represented by one or more computing systems. In particular embodiments, the computing system 402 may interface one or more artificial reality systems (e.g., an augmented reality headset, virtual reality, headset, and the like). In particular embodiments, the computing system 402 may comprise an input module 404, an aggregation module 406, a 3D model module 408, a segmentation module 410, an object tracker module 412, and an update module 414.

In particular embodiments, the input module 404 may interface one or more cameras or sensors to receive input data. In particular embodiments, the input data may be embodied as captured images from cameras captured by one or more artificial reality systems. As an example and not by way of limitation, an artificial reality system may capture images of a 3D scene and send the captured images to the computing system 402. In particular embodiments, the computing system 402 may be embodied as the artificial reality system that captures the images of the 3D scene. In particular embodiments, the input module 404 may receive input data from sensors that is used to generate depth measurements. The input module 404 may send the captured images and/or depth measurements to the other modules of the computing system 402. As an example and not by way of limitation, the input module 404 may send the input data to the aggregation module 406, the 3D model module 408, the segmentation module 410, the object tracker module 412, and the update module 414.

In particular embodiments, the aggregation module 406 may aggregate one or more captured images to generate a point cloud as described herein. The aggregation module 406 may receive captured images from the input module 404 and aggregate the captured images to generate a point cloud of a region of a 3D scene. In particular embodiments, the aggregation module 406 may send the point cloud to other modules of the computing system 402. As an example and not by way of limitation, the aggregation module 406 may send the point cloud to the 3D model module 408, the segmentation module 410, the object tracker module 412, and the update module 414.

In particular embodiments, the 3D model module 408 may access a 3D model of a scene. In particular embodiments, the 3D model module 408 may generate a 3D model of a scene as described herein. As an example and not by way of limitation, the 3D model module 408 may receive captured images as input data from the input module 404. The 3D model module 408 may use the captured images to generate a 3D model of the scene. In particular embodiments, the 3D model module 408 may generate a high-resolution 3D model of the scene and a simple 3D model of the scene. The high-resolution 3D model may comprise a plurality of 3D voxels. The simple 3D model may be a subset of the 3D voxels of the high-resolution 3D model. The simple 3D model may comprise a plurality of voxel occupancy values. The 3D model module 408 may store the 3D models to be accessed by other modules of the computing system 402. The 3D model module 408 may send the 3D models to other modules of the computing system 402. As an example and not by way of limitation, the 3D model module 408 may send the 3D models to the segmentation module 410, the object tracker module 412, and the update module 414.

In particular embodiments, the segmentation module 410 may segment a 3D scene into a plurality of regions as described herein. In particular embodiments, the segmentation module 410 may use data and/or information from other modules to segment the 3D scene into a plurality of regions. In particular embodiments, the segmentation module 410 may access an update log of the update module 414 to determine when portions of the 3D have been updated. Based on a frequency of when a particular portion of the 3D scene has been updated, the segmentation module 410 may segment the 3D scene into regions to label the regions. The regions may be labelled as static, dynamic, etc. The segmentation module 410 may receive data from the object tracker module 412 to segment the 3D scene into regions as described herein. As an example and not by way of limitation, the segmentation module 410 may identify particular objects in the 3D scene and segment the 3D scene into a plurality of regions where one region comprises the particular objects. The objects may be assigned particular characteristics, which may then be used to segment the 3D scene into regions. The segmentation module 410 may continually update the regions and segment a 3D scene to ensure the regions are properly segmented. That is, the segmentation module 410 may continually check to see if there are any updates to the 3D model where a previous segmentation may need to be updated. The segmentation module 410 may send a segmentation mapping of the regions of the 3D scene and labels for each of the regions to the other modules of the computing system 402. As an example and not by way of limitation, the segmentation module 410 may send the segmentation mapping and the labels of the regions to the update module 414.

In particular embodiments, the object tracker module 412 may identify and track one or more objects in the 3D scene. The object tracker module 412 may receive input data from the input module 404 and 3D models from the 3D model module to track objects in the 3D scene. In particular embodiments, the object tracker module 412 may perform 2D segmentation on one or more images received from the input module 404 to identify one or more objects in the images. The object tracker module 412 may use the 3D models to label the corresponding voxels of objects and apply the semantic information to the corresponding voxels. The object tracker module 412 may maintain a database of the identified objects within the 3D scene. The object tracker module 412 may send the database of identified objects to other modules of the computing system 402. As an example and not by way of limitation, the object tracker module 412 may send the database of identified objects to the 3D model module 408, the segmentation module 410, and the update module 414.

In particular embodiments, the update module 414 may determine when to update a high-resolution 3D model of the scene. In particular embodiments, the update module 414 may determine when to update a region of the high-resolution 3D model of the scene. The update module 414 may receive data and information from all of the other modules of the computing system 402 to determine when to update a region of the high-resolution 3D model and perform the update to the region of the high-resolution 3D model as described herein. In particular embodiments, the update module 414 may use depth measurements from the input module 404, point cloud from the aggregation module 406 to compare to a 3D model from the 3D model module 408. The update module 414 may use the segmentation mapping from the segmentation module 410 and the database of identified objects from the object tracker module 412 to determine when to detect changes and determine when to update the 3D model as described herein. As an example and not by way of limitation, the update module 414 may use the segmentation mapping to identify static regions of the 3D scene and periodically check to determine if there are updates to the static regions by using the depth measurements or point cloud to compare to a simple 3D model. More specifically, the update module 414 may detect if there is a difference between the depth measurements or point cloud to the simple 3D model. When the update module 414 determines an update is needed (e.g., a difference or change greater than a threshold change is detected), then the update module 414 may use the depth measurements or the point cloud to update the high-resolution 3D model. The updated high-resolution 3D model may be sent to the 3D model module 408 to maintain the updated 3D model.

Figure 5:
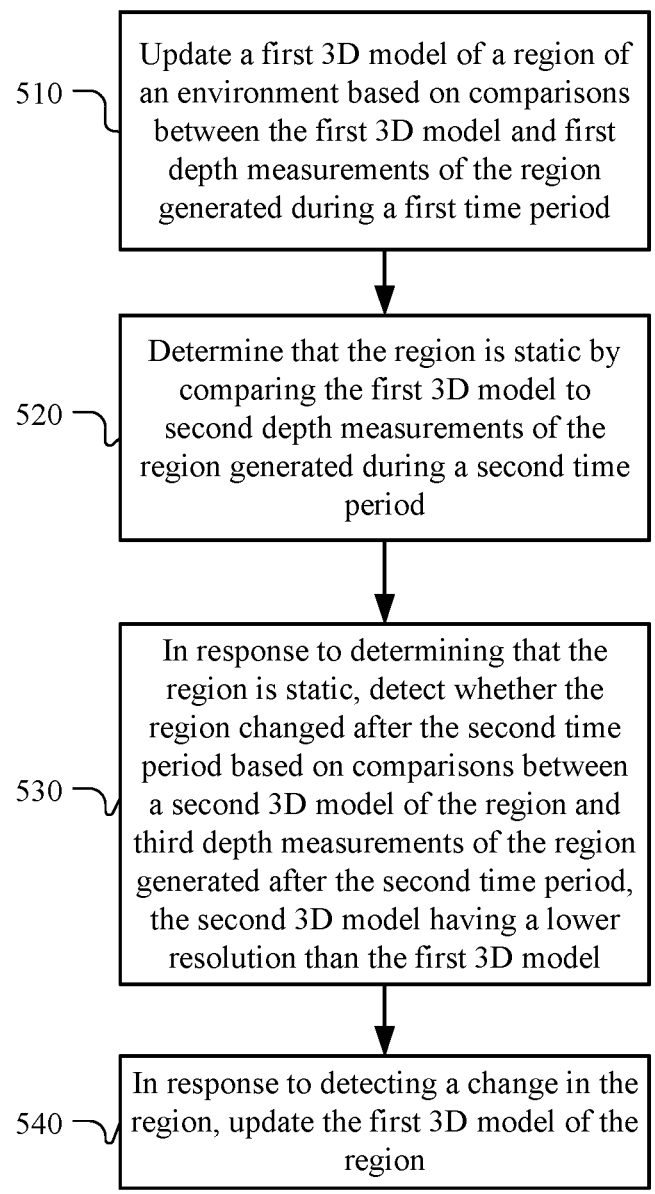
FIG. 5 illustrates an example method for updating a 3D model.

FIG. 5 illustrates an example method 500 for updating a 3D model. The method 500 may begin at step 510, where a computing system may update a first 3D model of a region of an environment based on comparisons between the first 3D model and first depth measurements of the region generated during a first time period. At step 520, the computing system may determine that the region is static by comparing the first 3D model to second depth measurements of the region generated during a second time period. At step 530, the computing system may in response to determining that the region is static, detect whether the region changed after the second time period based on comparisons between a second 3D model of the region and third depth measurements of the region generated after the second time period. In particular embodiments, the second 3D model may have a lower resolution than the first 3D model. At step 540, the computing system may in response to detecting a change in the region, update the first 3D model of the region. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for updating a 3D model, including the particular steps of the method of FIG. 5, this disclosure contemplates any suitable method of updating a 3D model, including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
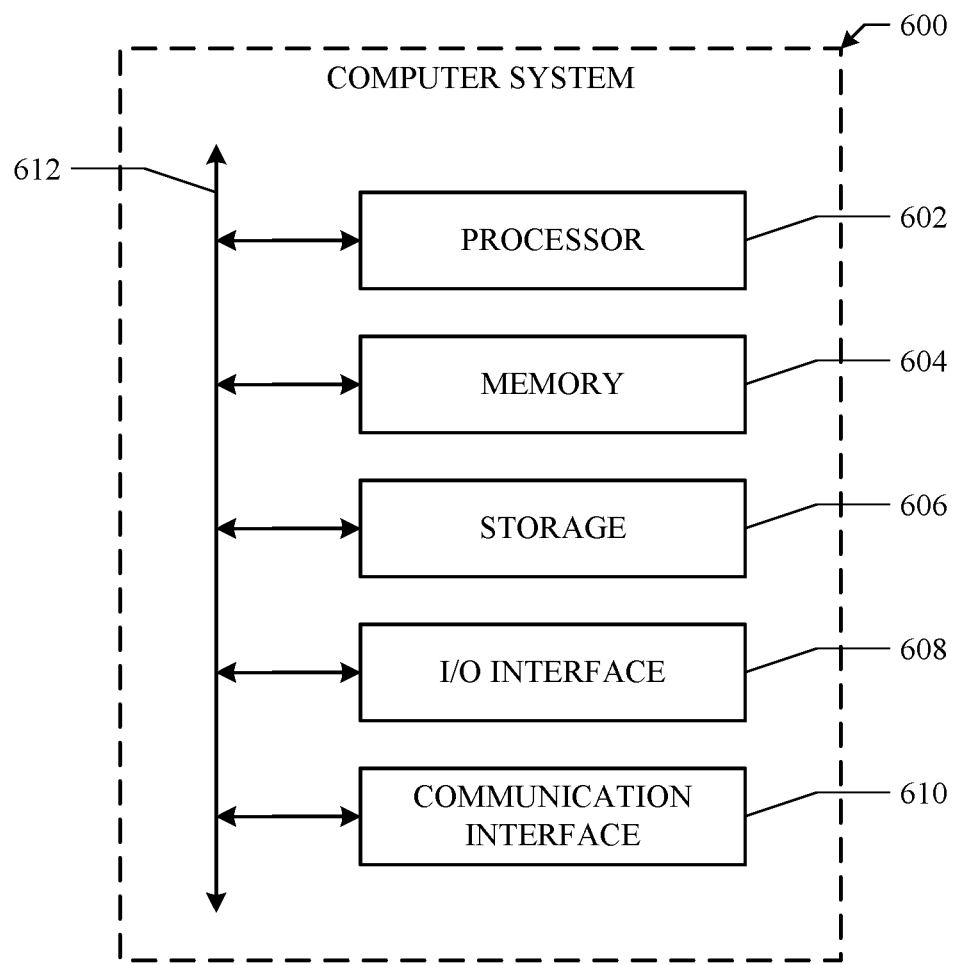
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   updating a first 3D model of a region of an environment based on comparisons between the first 3D model and first depth measurements of the region of the environment generated during a first time period;
   determining that the region of the environment is static by comparing the first 3D model to second depth measurements of the region of the environment generated during a second time period;
   in response to the determining that the region of the environment is static, detecting whether the region of the environment changed after the second time period based on comparisons between a second 3D model of the region of the environment and third depth measurements of the region of the environment generated after the second time period; and
   in response to detecting a change in the region of the environment, updating the first 3D model of the region of the environment.

2. The method of claim 1, wherein the first 3D model comprises a plurality of voxels.

3. The method of claim 2, wherein the second 3D model comprises a set of the plurality of voxels of the first 3D model.

4. The method of claim 1, wherein the second 3D model comprises a plurality of voxel occupancy values.

5. The method of claim 1, further comprising:
   identifying one or more objects using the first 3D model to detect objects m the environment; and
   assigning one or more characteristics to the identified one or more objects based on a respective object.

6. The method of claim 5, further comprising:
   segmenting the environment into a plurality of regions based on the one or more characteristics assigned to the identified one or more objects.

7. The method of claim 5, further comprising:
   tracking the one or more identified objects based on the first 3D model, wherein updates to the first 3D model updates a position of the one or more identified objects.

8. The method of claim 1, further comprising:
   segmenting the environment into a plurality of regions based on a predetermined segmentation pattern for the environment.

9. The method of claim 1, wherein one or more characteristics are associated with the region of the environment, and wherein the detecting whether the region of the environment changed occurs after a third time period based on the one or more characteristics associated with the region of the environment.

10. The method of claim 1, wherein the detecting whether the region of the environment changed comprises comparing the third depth measurements of the region of the environment to a plurality of voxels of the second 3D model of the region of the environment.

11. The method of claim 1, wherein the detecting whether the region of the environment changed comprises comparing the third depth measurements of the region of the environment to a plurality of voxel occupancy values of the second 3D model of the region of the environment.

12. The method of claim 1, wherein the detecting whether the region of the environment changed comprises determining whether the change between the second 3D model of the region of the environment and the third depth measurements of the region of the environment generated after the second time period exceeds a threshold change.

13. The method of claim 12, wherein the threshold change comprises one of a threshold number of voxels or a threshold number of voxel occupancy values.

14. The method of claim 1, further comprising: labeling one or more other regions of the first 3D model based on a frequency of previous updates to the one or more other regions of the first 3D model, wherein the detecting whether the region of the environment changed occurs after a third time period based on a label of the region of the environment.

15. The method of claim 1, further comprising:
   detecting whether a second region changed after a third time period based on comparisons between the second 3D model of the second region and fourth depth measurements of the second region; and
   in response to detecting a change in the second region falls below a threshold change, skipping an update to the first 3D model of the second region.

16. The method of claim 1, wherein the second 3D model has a lower resolution than the first 3D model.

17. One or more computer-readable non-transitory storage media embodying software that is operable when executed by one or more processors to:

update a first 3D model of a region of an environment based on comparisons between the first 3D model and first depth measurements of the region of the environment generated during a first time period;

determine that the region of the environment is static by comparing the first 3D model to second depth measurements of the region of the environment generated during a second time period;

in response to determining that the region of the environment is static, detect whether the region of the environment changed after the second time period based on comparisons between a second 3D model of the region of the environment and third depth measurements of the region of the environment generated after the second time period; and in response to detecting a change in the region of the environment, update the first 3D model of the region of the environment.

18. The one or more computer-readable non-transitory storage media of claim 17, wherein the one or more computer-readable non-transitory storage media is further operable when executed to:

identify one or more objects using the first 3D model to detect objects m the environment; and assign one or more characteristics to the identified one or more objects based on a respective object.

19. A system comprising:
one or more processors; and
one or more computer-readable non-transitory storage media coupled to the one or more processors and comprising instructions operable when executed by the one or more processors to cause the system to:

update a first 3D model of a region of an environment based on comparisons between the first 3D model and first depth measurements of the region of the environment generated during a first time period;

determine that the region of the environment is static by comparing the first 3D model to second depth measurements of the region of the environment generated during a second time period;

in response to determining that the region of the environment is static, detect whether the region of the environment changed after the second time period based on comparisons between a second 3D model of the region of the environment and third depth measurements of the region of the environment generated after the second time period; and in response to detecting a change in the region of the environment, update the first 3D model of the region of the environment.

20. The system of claim 19, wherein the instructions are further executable by the one or more processors to:

identify one or more objects using the first 3D model to detect objects m the environment; and assign one or more characteristics to the identified one or more objects based on a respective object.

* * * * *